(12) United States Patent
Zhang

(10) Patent No.: US 10,486,758 B1
(45) Date of Patent: Nov. 26, 2019

(54) GOLF CART DROP AXLE LIFT KIT

(71) Applicant: Yujie Zhang, Simpsonville, SC (US)

(72) Inventor: Yujie Zhang, Simpsonville, SC (US)

(*) Notice: Subject to any disclaimer, the term of this patent is extended or adjusted under 35 U.S.C. 154(b) by 0 days.

(21) Appl. No.: 15/983,485

(22) Filed: May 18, 2018

(51) Int. Cl.
| | |
|---|---|
| B60G 15/06 | (2006.01) |
| B62D 65/12 | (2006.01) |
| B62D 21/18 | (2006.01) |
| B62D 65/02 | (2006.01) |

(52) U.S. Cl.
CPC .......... B62D 65/12 (2013.01); B62D 21/183 (2013.01); B62D 65/024 (2013.01)

(58) Field of Classification Search
CPC .. B62D 65/12; B62D 21/183; B60Y 2200/23; A63C 55/61
See application file for complete search history.

(56) References Cited

U.S. PATENT DOCUMENTS

| | | | | |
|---|---|---|---|---|
| 5,967,536 | A * | 10/1999 | Spivey ................... | B60G 7/001 |
| | | | | 280/124.141 |
| 7,581,740 | B1 * | 9/2009 | Stimely ................... | B60G 3/20 |
| | | | | 280/124.136 |
| 8,801,037 | B1 * | 8/2014 | Inoue ..................... | B60G 3/06 |
| | | | | 280/124.125 |
| 2007/0267826 | A1 * | 11/2007 | Furman .................. | B60G 9/003 |
| | | | | 280/6.157 |
| 2007/0267837 | A1 * | 11/2007 | Sanville ................. | B60G 3/06 |
| | | | | 280/124.134 |
| 2007/0267839 | A1 * | 11/2007 | Furman .................. | B60G 9/003 |
| | | | | 280/124.147 |
| 2018/0354329 | A1 * | 12/2018 | Zhang ..................... | B60G 7/02 |

\* cited by examiner

*Primary Examiner* — Brian L Swenson
(74) *Attorney, Agent, or Firm* — Dority & Manning, P.A.

(57) ABSTRACT

A drop axle lift kit for a golf cart includes a base plate. Each support arm of a pair of support arms is positioned proximate a respective lateral side of the base plate. Each support plate of a pair of support plates is mounted to a respective support arm of the pair of support arms at a distal end of the respective support arm. A pair of rod end bearings is configured to rotatably support a front steering spindle of the golf cart such that the front steering spindle of the golf cart is rotatable about an axis. The pair of rod end bearings is mounted to one of the pair of support plates such that an angle defined between the axis and vertical is adjustable in order to change a canter of a wheel on the front steering spindle of the golf cart.

20 Claims, 5 Drawing Sheets

GOLF CART DROP AXLE LIFT KIT

FIELD OF THE INVENTION

The present subject matter relates generally to lift kits for golf cart suspensions.

BACKGROUND OF THE INVENTION

A golf cart generally includes a front suspension that connects the golf cart's frame and front wheels. The front suspension allows relative motion between the frame and front wheels. Thus, the front suspension contributes to the handling and ride quality of the golf cart.

A ride height of the front suspension is generally factory selected, and golf cart manufacturers frequently tune the front suspension for road or golf course conditions. Thus, the factory ride height of many golf carts is lower than preferred by some golf carts users. To increase the golf cart's ride height, a lift kit may be added to supplement or replace the factory front suspension. However, known lift kits have certain drawbacks.

As an example, some lift kits completely replace the factory front suspension. Such lift kits are expensive due to the numerous components required to completely replace the factory front suspension. As another example, certain lift kits require modifying the golf cart's frame. In particular, such lift kits can require drilling, welding or cutting the golf cart's frame, and such modifications can be labor intensive and/or require tools not available to all golf carts users.

Accordingly, a golf cart front suspension lift kit that does not require completely replacing the factory front suspension and/or that does not require modifying a frame of the golf cart would be useful.

BRIEF DESCRIPTION OF THE INVENTION

Aspects and advantages of the invention will be set forth in part in the following description, or may be apparent from the description, or may be learned through practice of the invention.

In a first example embodiment, a drop axle lift kit for a golf cart includes a base plate mountable to one or more leaf springs of the golf cart. A pair of support arms is mounted to the base plate such that the pair of support arms extend away from a bottom of the base plate. Each support arm of the pair of support arms is positioned proximate a respective lateral side of the base plate. The drop axle lift kit also includes a pair of support plates. Each support plate of the pair of support plates is mounted to a respective support arm of the pair of support arms at a distal end of the respective support arm. A pair of rod end bearings is mounted to one of the pair of support plates. The pair of rod end bearings is configured to rotatably support a front steering spindle of the golf cart such that the front steering spindle of the golf cart is rotatable about an axis. The pair of rod end bearings is mounted to the one of the pair of support plates such that an angle defined between the axis and vertical is adjustable in order to change a canter of a wheel on the front steering spindle of the golf cart.

In a second example embodiment, a drop axle lift kit for a golf cart includes a base plate mountable to one or more leaf springs of the golf cart. A pair of support arms is mounted to the base plate. Each support arm of the pair of support arms is positioned at respective lateral side of the frame. The drop axle lift kit also includes a pair of support plates. Each support plate of the pair of support plates is mounted to a respective support arm of the pair of support arms at a distal end of the respective support arm. A pair of rod end bearings is mounted to one of the pair of support plates. The pair of rod end bearings is configured to rotatably support a front steering spindle of the golf cart such that the front steering spindle of the golf cart is rotatable about an axis. The pair of rod end bearings is mounted to the one of the pair of support plates such that an angle defined between the axis and vertical is adjustable in order to change a canter of a wheel on the front steering spindle of the golf cart. The pair of support plates is vertically spaced from the base plate by no less than three inches and no more than eight inches when the base plate is mounted to the one or more leaf springs of the golf cart.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
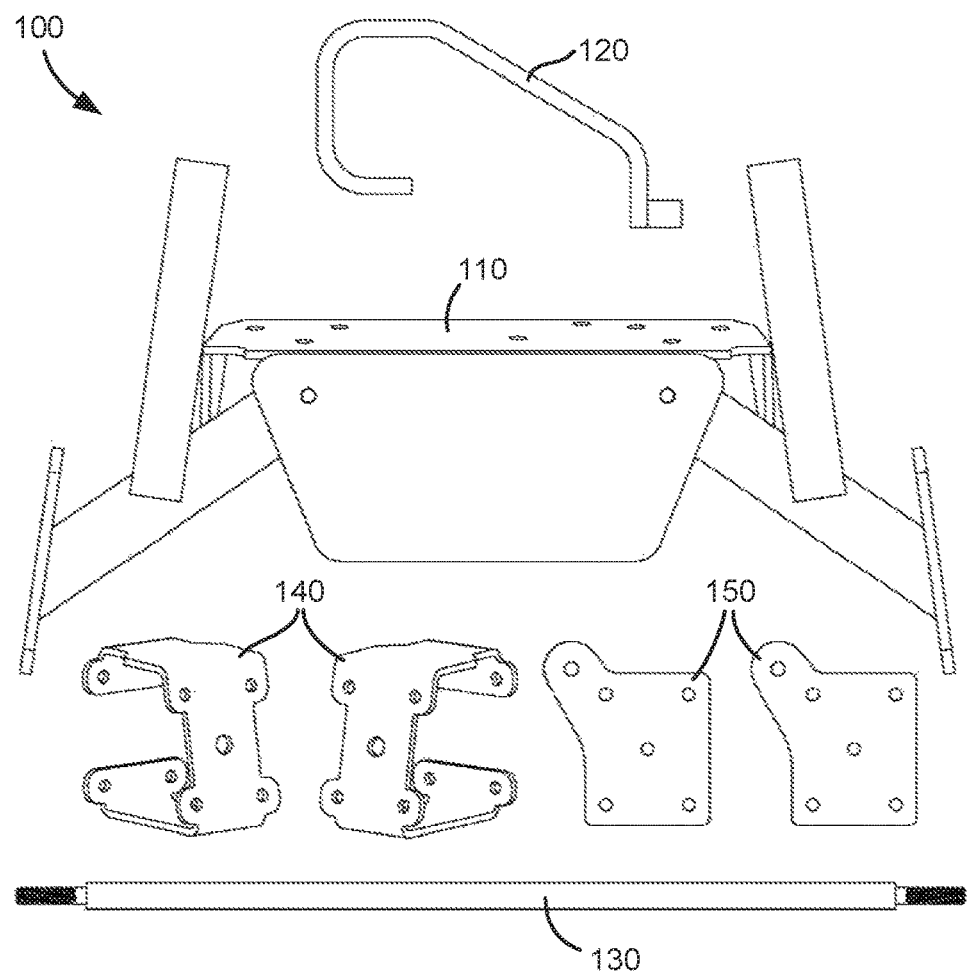
FIG. 1 shows a drop axle lift kit for a golf cart according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It will be understood that the golf cart lift kits described herein may be used in or with any suitable golf cart. As an example, the front suspension lift kits described herein may be used in or with a EZGO® TXT golf cart. Thus, the drop axle lift kits are described in greater detail below in the context of and are illustrated as suitable for use in EZGO®

TXT golf carts. However, the present subject matter is not limited to any particular golf car model, style or arrangement. The use of the term "about" when used in conjunction with a numerical value is intended to refer to within twenty five percent (25%) of the stated numerical value.

FIG. 1 provides a perspective view of a drop axle lift kit 100 for a golf cart according to an example embodiment of the present subject matter. As shown in FIG. 1, drop axle lift kit 100 includes a front frame 110, a steering riser 120, a tie rod 130, a pair of rear risers 140 and a pair of rear shock plates 150. As discussed in greater detail below, the components of drop axle lift kit 100 shown in FIG. 1 are mountable on a golf cart and may cooperate with factory components of the golf cart to adjust a ride height of the golf cart. Drop axle lift kit 100 also includes various components for mounting front frame 110, steering riser 120, tie rod 130, rear risers 140 and/or rear shock plates 150 on the golf cart. For example, drop axle lift kit 100 may include nuts, bolts, lock nuts, etc.

Figure 2:
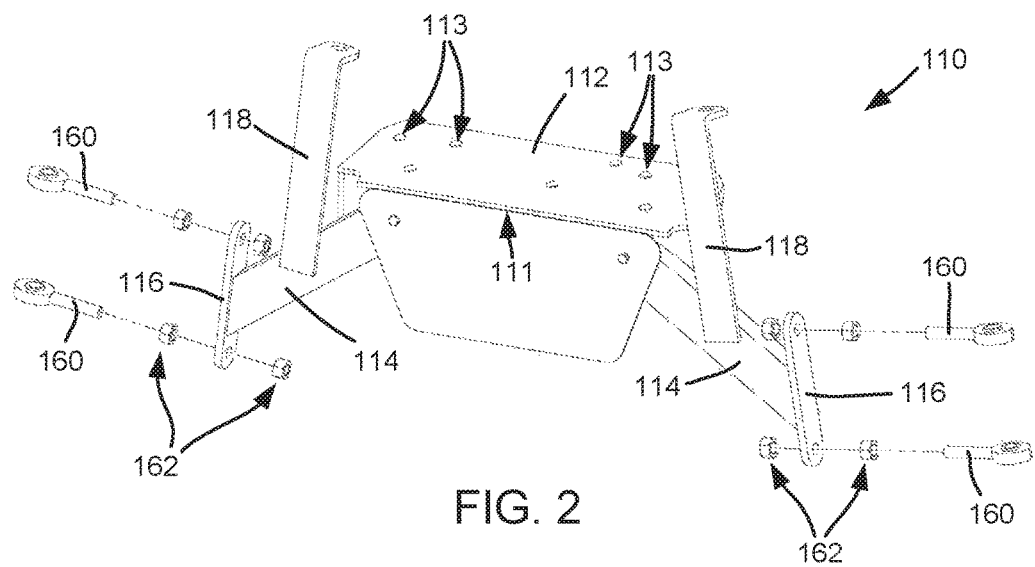
FIG. 2 is a partially exploded, perspective view of a front frame of the example drop axle lift kit of FIG. 1.
Figure 3:
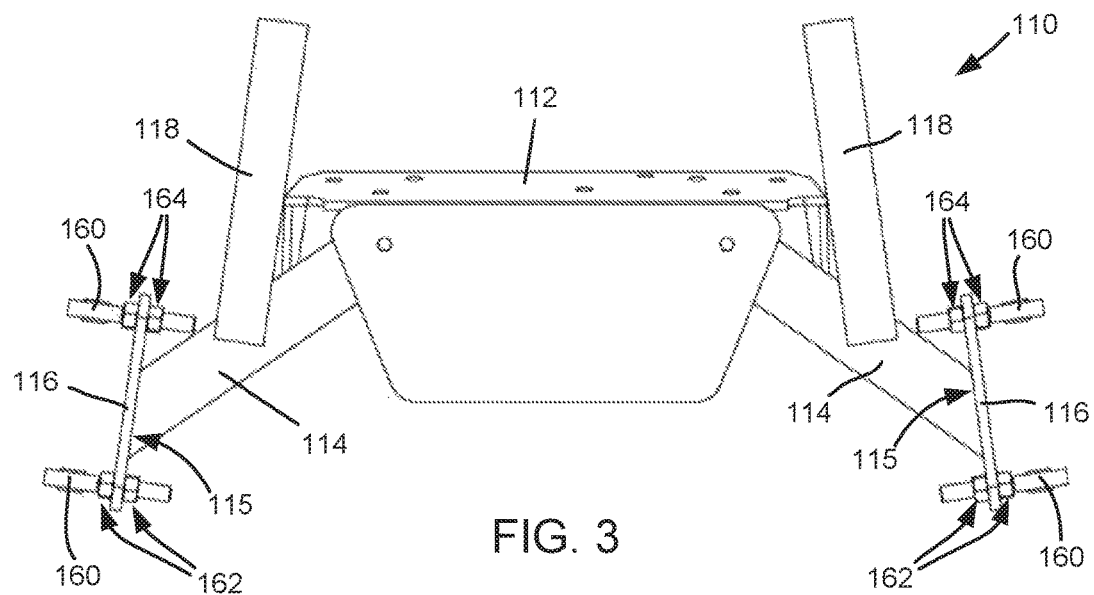
FIG. 3 provides front, elevation view of the front frame of FIG. 2.

FIG. 2 provides a partially exploded, perspective view of front frame 110, and FIG. 3 provides a front, elevation view of front frame 110. Front frame 110 is mountable at a front suspension of a golf cart. Thus, front frame 110 is configured to increase the ride height of the golf cart at the front suspension of the golf cart. In contrast, rear risers 140 and rear shock plates 150 may be mountable at a rear suspension of the golf cart. Thus, rear risers 140 and rear shock plates 150 are configured to increase the ride height of the golf cart at the rear suspension of the golf cart, as discussed in greater detail below.

Figure 4:
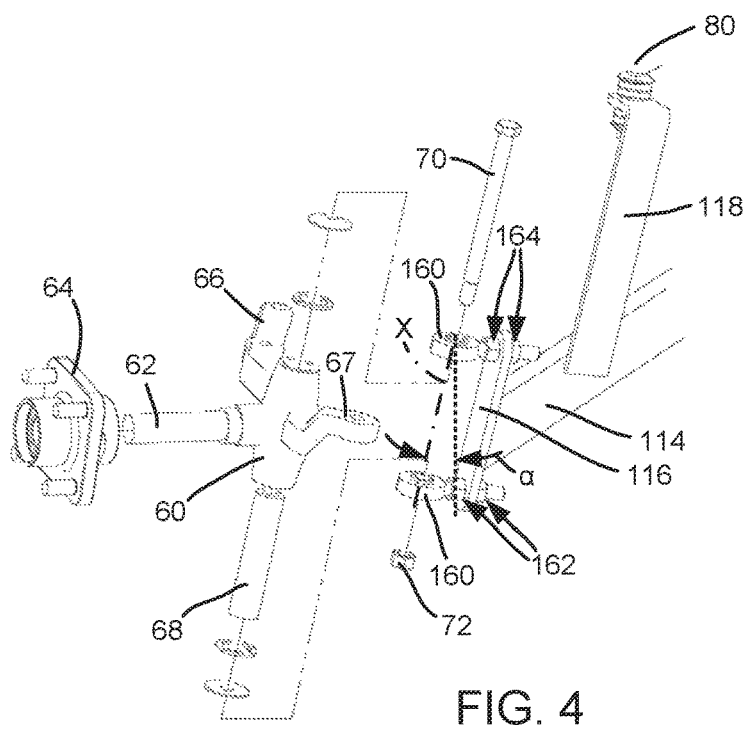
FIG. 4 is an exploded view of a golf cart steering spindle for mounting on rod end bearings of the example drop axle lift kit of FIG. 1.
Figure 5:
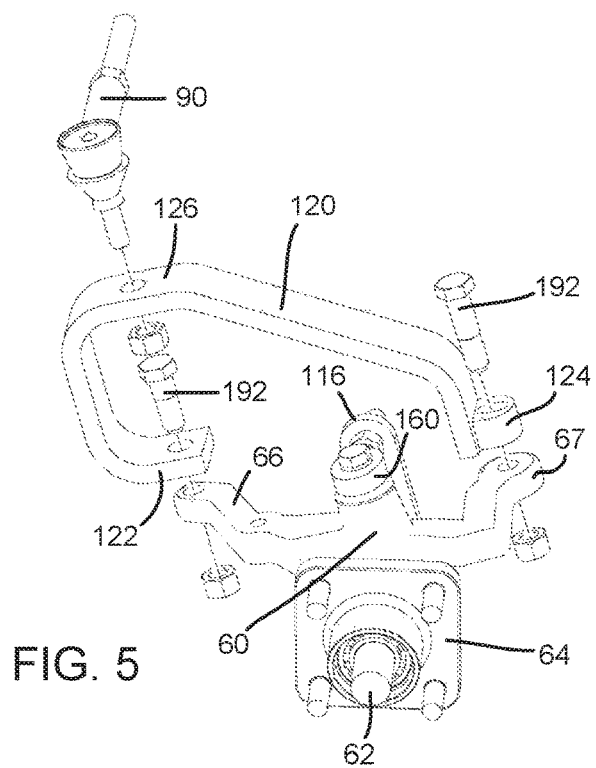
FIG. 5 is an exploded view of a steering riser of the example drop axle lift kit of FIG. 1 with the golf cart steering spindle of FIG. 4 and a rack ball joint.
Figure 6:
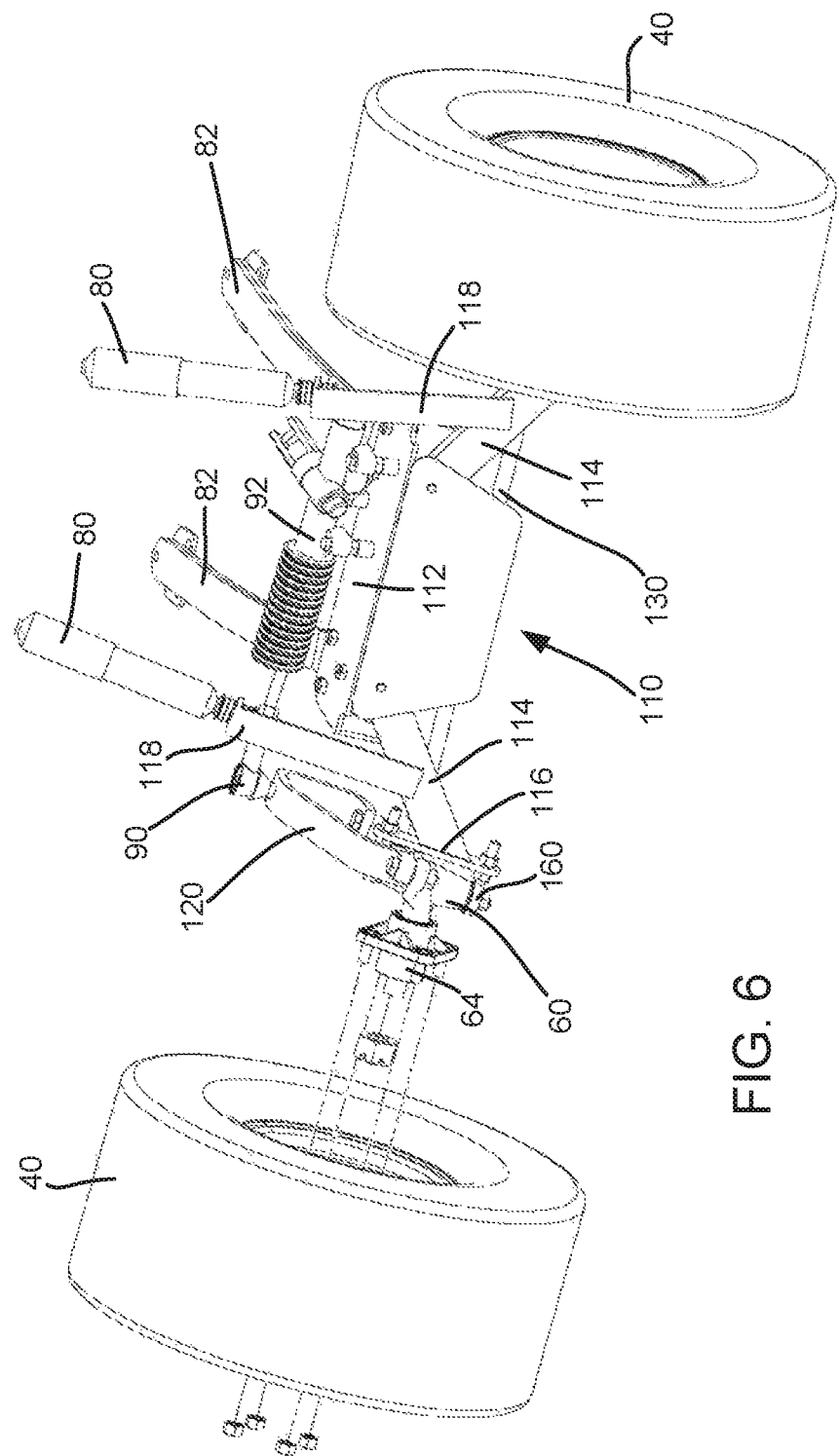
FIG. 6 is a perspective view of the front frame of FIG. 2 to front suspension golf cart components.

In FIGS. 4 through 6, certain components of a golf cart are shown mounted to front frame 110. Such components of the golf cart may be factory or stock components that drop axle lift kit 100 cooperates with to adjust a ride height of the golf cart. As may be seen in FIGS. 4 through 6, the golf cart includes wheels 40, a front steering spindle 60 for a wheel hub 64, a kingpin 70, shocks 80, leaf springs 82, a rack ball joint 90, and a rack and pinion assembly 92. Thus, wheels 40, front steering spindle 60, wheel hub 64, kingpin 70, shocks 80, leaf springs 82, rack ball joint 90, and rack and pinion assembly 92 may be factory or stock components of the golf cart and are not components of drop axle lift kit 100. As discussed in greater detail below, drop axle lift kit 100 may be mounted to or on such existing components of the golf cart to adjust the ride height of the golf cart.

As shown in FIGS. 2 and 3, front frame 110 includes a base plate 112. Base plate 112 defines a plurality of mounting holes 113. Various components of the golf cart, such as leaf springs 82 and/or rack and pinion assembly 92, may be mounted to base 112. For example, bolts may pass through base plate 112 and the golf cart components, and nuts may be threaded to the bolts to secure the golf cart components on base plate 112. Mounting holes 113 in base plate 112 allow the leaf springs 82 and/or rack and pinion assembly 92 from the golf cart to be mounted to base plate 112, e.g., without drilling of a frame 30 (FIG. 7) or other component of the golf cart.

Front frame 110 also includes a pair of support arms 114. Support arms 114 are mounted to base plate 112. For example, support arms 114 may be welded to base plate 112 at a bottom surface 111 of base plate 112. Support arms 114 may extend downwardly from base plate 112, e.g., from bottom surface 111 of base plate 112. Each support arm 114 may be positioned proximate a respective lateral side of base plate 112. Thus, e.g., support arms 114 may extend in opposite lateral directions from base plate 112, as shown in FIGS. 2 and 3.

A pair of support plates 116 is mounted to support arms 114. In particular, each support plate 116 may be mounted to a respective one of support arms 114 at a distal end 115 of the respective support arm 114. Support plates 116 may be welded to support arms 114 at the distal ends 115 of support arms 114. As shown in FIG. 3, support plates 116 may be angled on support arms 114 such that a top of each support plate 116 is laterally closer to base plate 112 than a bottom of each support plate 116. A respective pair of rod end bearings 160 is mounted to each support plate 116. Rod end bearings 160 are discussed in greater detail below in the context of FIG. 4.

Support plates 116 are positioned below base plate 112, e.g., when base plate 112 is mounted to leaf springs 82 and other components of the golf cart. For example, support plates 116 may be vertically spaced from base plate 112 by an amount corresponding to the increased ride height provided by drop axle lift kit 100. Thus, e.g., support plates 116 may be vertically spaced from base plate 112 by about three inches (3"), about four inches (4"), about six inches (6"), etc.

Front frame 110 also includes a pair of shock brackets 118. Each shock bracket 118 may be mounted to a respective one of support arms 114. For example, an end of each shock bracket 118 may be welded to the respective one of support arms 114. Each shock bracket 118 may extend upwardly from the respective one support arms 114. A respective shock 80 (FIGS. 4 and 6) is mountable to each shock bracket 118. For example, one end of the respective shock 80 may be coupled to a distal end of each shock bracket 118 such that the shocks 80 extend between and couple shock brackets 118 and frame 30 of the golf cart. In such a manner, shocks 80 from the golf cart may be advantageously coupled to front frame 110, e.g., such that the golf cart does not require new, longer shocks.

FIG. 4 shows one of support plates 116 and one pair of rod end bearings 160, in particular a left or passenger side support plate 116 and rod end bearings 160. It will be understood that the other of support plates 116 with the other pair of rod end bearings 160, i.e., a right or driver side support plate 116 and rod end bearings 160, may be arranged and constructed in the same or similar manner to that shown in FIG. 4. As shown in FIG. 4, rod end bearings 160 are mounted to support plate 116. On support plate 116, rod end bearings 160 are configured to rotatably support front steering spindle 60. Thus, front steering spindle 60 from the golf cart may be advantageously coupled to front frame 110, e.g., such that the golf cart does not require new front steering spindles.

Rod end bearings 160 may support front steering spindle 60 such that front steering spindle 60 is rotatable about an axis X on rod end bearings 160. Rod end bearings 160 are also mounted to support plate 116 such that an angle α is defined between the axis X and vertical (shown with a dashed line) is adjustable. By adjusting the angle α with rod end bearings 160 a canter of a wheel 40 (FIG. 6) on front steering spindle 60 is adjustable. In such a manner, performance of an associated golf cart can be advantageously improved by changing or tuning the canter of wheels 40 at a front of the golf cart.

Rod end bearings 160 and/or support plate 116 may be configured for adjusting the angle α with various mechanisms. For example, front frame 110 may include a first pair of nuts 162 and a second pair of nuts 164 for each support plate 116. As shown in FIG. 4, first nuts 162 may be threaded to one of rod end bearings 160 on support plate 116, and second nuts 164 may be threaded to the other of rod end bearings 160 on support plate 116. First nuts 162 may be threaded to the one of rod end bearings 160 such that support plate 116 is positioned between first nuts 162 on a threaded post of the one of rod end bearings 160. In particular, first nuts 162 may be threaded onto the one of rod end bearings 160 such that first nuts 162 are compressed onto support plate 116. Second nuts 164 may be threaded in the same or similar manner to the other of rod end bearings 160 on support plate 116. The angle α may be adjustable by rotating first nuts 162 on the one of rod end bearings 160, by rotating second nuts 164 on the other of rod end bearings 160, or both. Thus, e.g., the lateral distance between a kingpin 70 that extends along the axis X between rod end bearings 160 may be changed by rotating first nuts 162 on the one of rod end bearings 160, by rotating second nuts 164 on the other of rod end bearings 160, or both and thereby adjust the angle α.

The angle α may be adjustable by a suitable amount. For example, rod end bearings 160 may be mounted to support plate 116 such that the angle α is adjustable by no less than five degrees (5°) and no more than thirty degrees (30°) or by no less than three degrees (3°) and no more than twenty degrees (20°), etc. Such adjustably may allow desirable changing of the canter of the wheel 40 on front steering spindle 60.

As shown in FIG. 4, front steering spindle 60 includes an axle 62. Wheel hub 64 is rotatable mountable on axle 62. In turn, one of wheels 40 (FIG. 6), e.g., a rim of the wheel 40, may be mounted to wheel hub 64. In such a manner, wheel 40 may mounted to front steering spindle 60 such that wheel 40 is rotatable relative to front steering spindle 60 on axle 62. As noted above, front steering spindle 60 is rotatable on rod end bearings 160. As discussed in greater detail below, a driver of the golf cart may turn wheels 40 by turning a steering wheel (not show) which causes front steering spindle 60 is rotate on rod end bearings 160 and thus for wheel 40 to turn in response.

Front steering spindle 60 may be rotatably mounted to rod end bearings 160 with kingpin 70 of the golf cart. For example, kingpin 70 may extend through each of rod end bearings 160 and front steering spindle 60. A nut 72 may be treaded to kingpin 70 to securely couple kingpin 70 in front steering spindle 60. Front steering spindle 60 may rotate on kingpin 70 about the axis X between rod end bearings 160. In particular, front steering spindle 60 may include a bushing 68, and kingpin 70 may contact and rotate against bushing 68 within front steering spindle 60. As may be seen from the above, kingpin 70 may extend along the axis X between rod end bearings 160, and kingpin 70 may function as an axle about which front steering spindle 60 is rotatable between rod end bearings 160.

Turning now to FIG. 5, front steering spindle 60 may include a rear steering arm 66 and a front steering arm 67. Rear steering arm 66 and front steering arm 67 may be positioned opposite each other on front steering spindle 60 and may extend in opposite directions perpendicular to the axis A. Steering riser 120 is mountable to rear steering arm 66 and front steering arm 67 on front steering spindle 60. For example, steering riser 120 may be mounted to front steering spindle 60 with bolts 192, and a respective bolt 192 may extend through steering riser 120 and each of rear steering arm 66 and front steering arm 67.

Rack ball joint 90 of the golf cart may also be mounted to steering riser 120. Thus, steering riser 120 may be coupled to front steering spindle 60 such that front steering spindle 60 is rotatable when rack ball joint 90 translates, as discussed in greater detail below. It will be understood that rack ball joint 90 is factory mounted to rear steering arm 66.

Steering riser 120 may vertically shift the mounting location for rack ball joint 90 upwardly, e.g., by an amount corresponding to the increased ride height provided by drop axle lift kit 100. In such a manner, steering riser 120 allows drop axle lift kit 100 to provide increased ride height without requiring replacement of front steering spindle 60 and/or rack ball joint 90. The connection between steering riser 120 and rear steering arm 66 may be vertically spaced from the connection between steering riser 120 and rack ball joint 90 by a suitable amount. For example, the connection between steering riser 120 and rear steering arm 66 may be vertically spaced from the connection between steering riser 120 and rack ball joint 90 by about three inches (3"), about four inches (4"), about six inches (6"), etc.

Rack ball joint 90 is coupled to rack and pinion assembly 92. In turn, rack and pinion assembly 92 is coupled to a steering wheel of a golf cart. When a driver turns the steering wheel, rack and pinion assembly 92 linearly translates rack ball joint 90. Because rack ball joint 90 is coupled to steering riser 120 (and thus front steering spindle 60), translation of rack ball joint 90 causes front steering spindle 60 to rotate about the axis X on kingpin 70.

Drop axle lift kit 100 may also include tie rod 130. However, it will be understood that tie rod 130 may be a factory component in certain example embodiments. Tie rod 130 is mountable to both of front steering spindles 60 (i.e., the passenger side front steering spindle and the driver side front steering spindle). In particular, tie rod 130 may extend between and couple the two front steering spindles 60 of the golf cart. When the driver turns the steering wheel, the rotation of the passenger front steering spindle 60 described above may be transferred to the driver side front steering spindle. In such a manner, the two front steering spindles 60 of the golf cart may be rotationally fixed to each other with tie rod 130.

Figure 7:
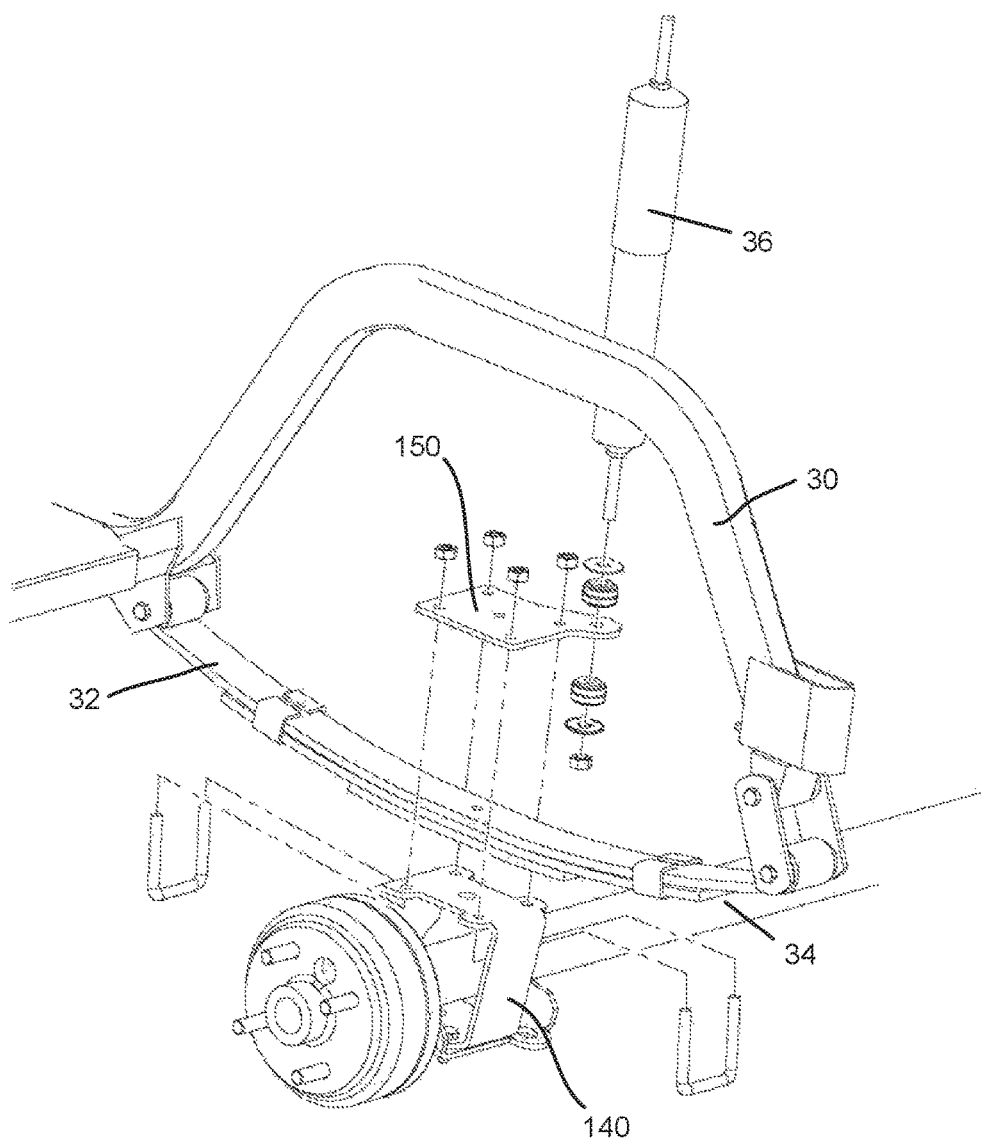
FIG. 7 is a perspective view of rear risers and rear shock plates of the example drop axle lift kit of FIG. 1 mounted to rear suspension golf cart components.

FIG. 7 is a perspective view of one of rear risers 140 and one of rear shock plates 150 of drop axle lift kit 100 mounted to rear suspension golf cart components. Although only one of rear risers 140 and one of rear shock plates 150 are shown in FIG. 7. It will be understood that the other of rear risers 140 and the other of rear shock plates 150 may be constructed in the same or similar manner to that described below in the context of FIG. 7.

The rear suspension golf cart components may be factory or stock components that drop axle lift kit 100 cooperates with to adjust a ride height of the golf cart. As may be seen in FIG. 7, the golf cart includes a frame 30, a rear leaf spring 32, a rear axle 34, and a rear shock 36. Thus, frame 30, rear leaf spring 32, rear axle 34 and rear shock 36 may be factory or stock components of the golf cart and are not components of drop axle lift kit 100. As discussed in greater detail below, drop axle lift kit 100 may be mounted to or on such existing components of the golf cart to adjust the ride height of the golf cart.

Rear riser 140 and rear shock plate 150 are mounted to rear leaf spring 32. In particular, U-bolts may extend through rear riser 140 and rear shock plate 150 in order to mount rear riser 140 and rear shock plate 150 to rear leaf spring 32. Rear leaf spring 32 may be compressed between rear riser 140 and rear shock plate 150 when such components are bolted together. Rear shock 36 may also be coupled to rear shock plate 150. For example, an end of rear shock plate 150 may be fastened to rear shock plate 150.

Rear riser 140 may vertically space rear axle 34 from rear leaf spring 32. Similarly, rear shock plate 150 may vertically adjust the connection point between rear shock 36 and axle 34. For example, the vertical spacing provided by rear riser

140 and rear shock plate 150 may correspond to the increased ride height provided by drop axle lift kit 100. Thus, e.g., rear riser 140 may vertically space rear axle 34 from rear leaf spring 32 by about three inches (3"), about four inches (4"), about six inches (6"), etc. Similarly, rear shock plate 150 may vertically adjust the connection point between rear shock 36 and axle 34 by about three inches (3"), about four inches (4"), about six inches (6"), etc.

As may be seen from the above, drop axle lift kit 100 utilizes and/or mounts to existing components of a golf cart. Thus, drop axle lift kit 100 may provide an economical solution to increase the ride height of the golf cart. In addition, drop axle lift kit 100 may be installed on the golf cart, e.g., without requiring drilling, cutting or welding on frame 30 of the golf cart.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drop axle lift kit for a golf cart, comprising:
    a base plate mountable to one or more leaf springs of the golf cart;
    a pair of support arms mounted to the base plate such that the pair of support arms extend away from a bottom of the base plate, each support arm of the pair of support arms positioned proximate a respective lateral side of the base plate;
    a pair of support plates, each support plate of the pair of support plates mounted to a respective support arm of the pair of support arms at a distal end of the respective support arm; and
    a pair of rod end bearings mounted to one of the pair of support plates, the pair of rod end bearings configured to rotatably support a front steering spindle of the golf cart such that the front steering spindle of the golf cart is rotatable about an axis,
    wherein the pair of rod end bearings is mounted to the one of the pair of support plates such that an angle defined between the axis and vertical is adjustable in order to change a canter of a wheel on the front steering spindle of the golf cart.

2. The drop axle lift kit of claim 1, further comprising a first pair of nuts and a second pair of nut, the first pair of nuts threaded to a first one of the pair of rod end bearings such that the one of the pair of support plates is positioned between the first pair of nuts, the second pair of nuts threaded to a second one of the pair of rod end bearings such that the one of the pair of support plates is positioned between the second pair of nuts.

3. The drop axle lift kit of claim 2, wherein the angle defined between the axis and vertical is adjustable by rotating the first pair of nuts on the first one of the pair of rod end bearings, rotating the second pair of nuts on the second one of the pair of rod end bearings, or both.

4. The drop axle lift kit of claim 1, wherein each support plate of the pair of support plates is welded to the respective support arm of the pair of support arms at the distal end of the respective support arm.

5. The drop axle lift kit of claim 1, wherein the pair of support plates are positioned below the base plate when the base plate is mounted to the one or more leaf springs of the golf cart.

6. The drop axle lift kit of claim 1, further comprising a steering riser mountable to a pair of spindle arms on the front steering spindle of the golf cart and a rack ball joint of the golf cart.

7. The drop axle lift kit of claim 6, wherein the base plate defines a plurality of mounting holes for mounting a rack and pinion of the golf cart.

8. The drop axle lift kit of claim 7, wherein the rack ball joint of the golf cart is linearly translatable with the rack and pinion of the golf cart.

9. The drop axle lift kit of claim 1, further comprising a second pair of rod end bearings, the second pair of rod end bearings mounted to the other of the pair of support plates, the second pair of rod end bearings configured to rotatably support a second front steering spindle of the golf cart such that the second front steering spindle of the golf cart is rotatable about a second axis on the second pair of rod end bearings, the second pair of rod end bearings mounted to the other of the pair of support plates such that the angle defined between the second axis and vertical is adjustable in order to change a canter of a wheel on the second front steering spindle of the golf cart.

10. The drop axle lift kit of claim 9, further comprising a tie rod, wherein the front steering spindle of the golf cart is a first front steering spindle of the golf cart, the tie rod mountable to the first and second front steering spindles of the golf cart such that the tie rod extends between and couples the first and second front steering spindles of the golf cart.

11. The drop axle lift kit of claim 1, further comprising a pair of shock brackets, each shock bracket of the pair of shock brackets mounted to a respective one of the pair of support arms such that each shock bracket of the pair of shock brackets extends upwardly from the respective one of the pair of support arms, a respective shock of the golf cart mountable to each of the pair of shock brackets.

12. A drop axle lift kit for a golf cart, comprising:
    a base plate mountable to one or more leaf springs of the golf cart;
    a pair of support arms mounted to the base plate, each support arm of the pair of support arms positioned at respective lateral side of the frame;
    a pair of support plates, each support plate of the pair of support plates mounted to a respective support arm of the pair of support arms at a distal end of the respective support arm; and
    a pair of rod end bearings mounted to one of the pair of support plates, the pair of rod end bearings configured to rotatably support a front steering spindle of the golf cart such that the front steering spindle of the golf cart is rotatable about an axis,
    wherein the pair of rod end bearings is mounted to the one of the pair of support plates such that an angle defined between the axis and vertical is adjustable in order to change a canter of a wheel on the front steering spindle of the golf cart, and
    wherein the pair of support plates are vertically spaced from the base plate by no less than three inches and no more than eight inches when the base plate is mounted to the one or more leaf springs of the golf cart.

13. The drop axle lift kit of claim 12, further comprising a first pair of nuts and a second pair of nut, the first pair of nuts threaded to a first one of the pair of rod end bearings such that the one of the pair of support plates is positioned between the first pair of nuts, the second pair of nuts threaded to a second one of the pair of rod end bearings such that the one of the pair of support plates is positioned between the second pair of nuts.

14. The drop axle lift kit of claim 13, wherein the angle defined between the axis and vertical is adjustable by rotating the first pair of nuts on the first one of the pair of rod end bearings, rotating the second pair of nuts on the second one of the pair of rod end bearings, or both.

15. The drop axle lift kit of claim 12, wherein each support plate of the pair of support plates is welded to the respective support arm of the pair of support arms at the distal end of the respective support arm.

16. The drop axle lift kit of claim 12, further comprising a steering riser mountable to a pair of spindle arms on the front steering spindle of the golf cart and a rack ball joint of the golf cart.

17. The drop axle lift kit of claim 16, wherein the base plate defines a plurality of mounting holes for mounting a rack and pinion of the golf cart, and the rack ball joint of the golf cart is linearly translatable with the rack and pinion of the golf cart.

18. The drop axle lift kit of claim 12, further comprising a second pair of rod end bearings, the second pair of rod end bearings mounted to the other of the pair of support plates, the second pair of rod end bearings configured to rotatably support a second front steering spindle of the golf cart such that the second front steering spindle of the golf cart is rotatable about a second axis on the second pair of rod end bearings, the second pair of rod end bearings mounted to the other of the pair of support plates such that the angle defined between the second axis and vertical is adjustable in order to change a canter of a wheel on the second front steering spindle of the golf cart.

19. The drop axle lift kit of claim 18, further comprising a tie rod, wherein the front steering spindle of the golf cart is a first front steering spindle of the golf cart, the tie rod mountable to the first and second front steering spindles of the golf cart such that the tie rod extends between and couples the first and second front steering spindles of the golf cart.

20. The drop axle lift kit of claim 12, further comprising a pair of shock brackets, each shock bracket of the pair of shock brackets mounted to a respective one of the pair of support arms such that each shock bracket of the pair of shock brackets extends upwardly from the respective one of the pair of support arms, a respective shock of the golf cart mountable to each of the pair of shock brackets.

* * * * *